(12) United States Patent
Lee et al.

(10) Patent No.: US 10,026,379 B2
(45) Date of Patent: Jul. 17, 2018

(54) DISPLAY DEVICE

(71) Applicant: Samsung Display Co., Ltd., Yongin-Si, Gyeonggi-Do (KR)

(72) Inventors: Luly Lee, Yongin-si (KR); Myoung-seok Son, Yongin-si (KR); Donghyeon Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 57 days.

(21) Appl. No.: 15/084,745

(22) Filed: Mar. 30, 2016

(65) Prior Publication Data

US 2017/0098430 A1   Apr. 6, 2017

(30) Foreign Application Priority Data

Oct. 1, 2015   (KR) .................. 10-2015-0138721

(51) Int. Cl.
 *G09G 5/10*   (2006.01)
(52) U.S. Cl.
 CPC ........... *G09G 5/10* (2013.01); *G09G 2300/02* (2013.01); *G09G 2300/0421* (2013.01)
(58) Field of Classification Search
 None
 See application file for complete search history.

(56) References Cited

U.S. PATENT DOCUMENTS

2011/0122650 A1* 5/2011 Osumi ................. G02B 6/0018
                                                                    362/606
2015/0211707 A1* 7/2015 Watanabe ......... G02F 1/133308
                                                                    345/667

FOREIGN PATENT DOCUMENTS

KR   1020100022780 A   3/2010
KR   1020150019876 A   2/2015

* cited by examiner

*Primary Examiner* — Joseph Haley
(74) *Attorney, Agent, or Firm* — Cantor Colburn LLP

(57) ABSTRACT

A display device includes a display panel which displays an image with light, the display panel including a first substrate, a second substrate facing the first substrate, and an image display layer disposed between the first and second substrates; a backlight unit which generates and provides the light to the display panel; and a bottom chassis facing the first substrate to dispose the second substrate therebetween and to define an inner space with the first substrate. The image display layer, the second substrate, and the backlight unit are accommodated in the inner space defined by the first substrate and the bottom chassis.

13 Claims, 3 Drawing Sheets

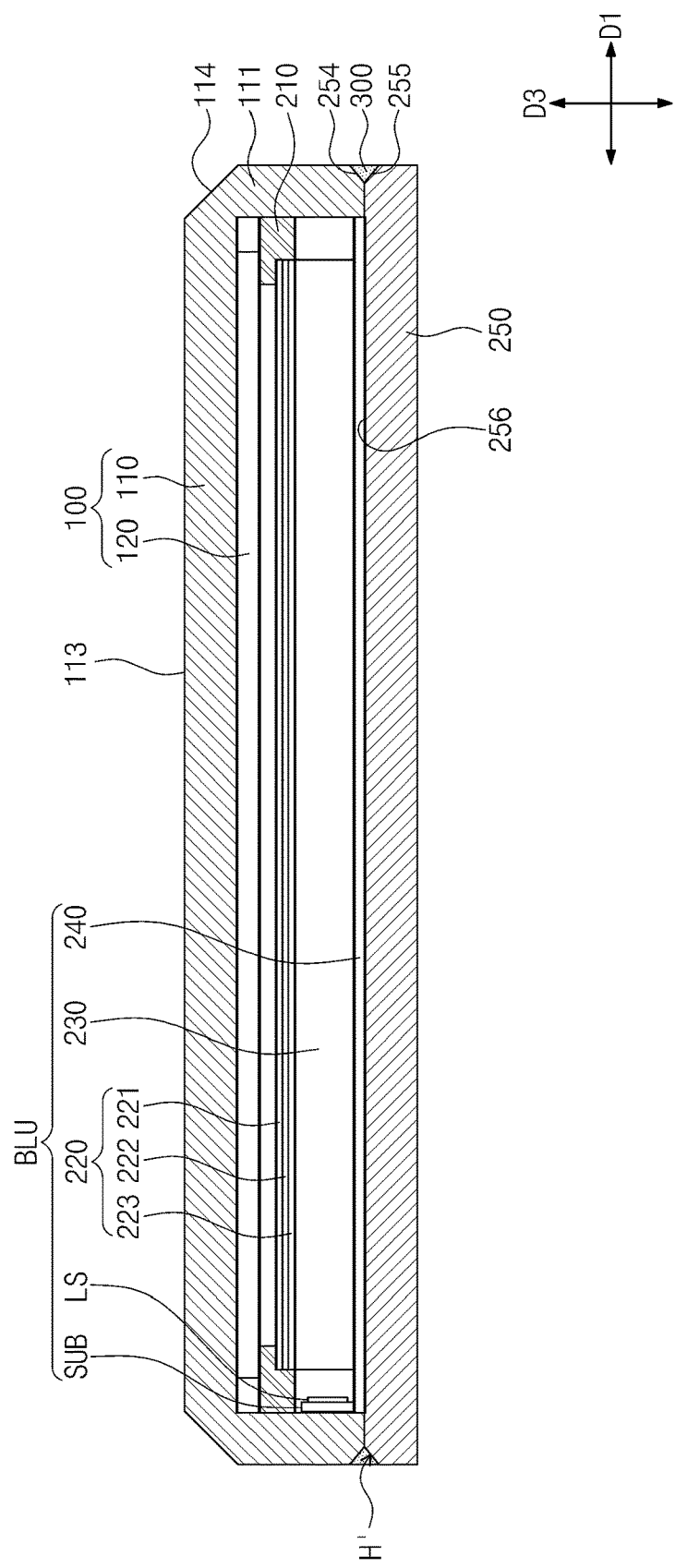

DISPLAY DEVICE

This application claims priority to Korean Patent Application No. 10-2015-0138721, filed on Oct. 1, 2015, and all the benefits accruing therefrom under 35 U.S.C. § 119, the content of which in its entirety is hereby incorporated by reference.

BACKGROUND (1) Field

The invention relates to a display device without a top case, and more particularly, to a display device in which a side surface of a display panel extends to a bottom chassis of the display device to fix a backlight unit therein.

(2) Description of the Related Art

The importance of a display device as media for delivering visual information is further emphasized in an information-oriented society. Characteristics such as relatively low power consumption, thickness and weight, and relatively high-definition display are desired to meet consumer requirements and to secure a leading place of such a display device in the future The display device may be classified into an emission type such as a cathode ray tube ("CRT") display, a electro luminescence ("EL") display, a light emitting diode ("LED") display, a vacuum fluorescent display ("VFD"), a field emission display ("FED") and a plasma display panel ("PDP"), and a non-emission type that does not self-generate light such as a liquid crystal display ("LCD").

Since the LCD, as a display device for displaying an image by using optical anisotropy of liquid crystal therein, has visibility greater than that of a typical cathode-ray tube display, a mean power consumption less than that of the typical cathode-ray tube display having the same display size and relatively low heat generation rate, the LCD is recognized as a next-generation display device together with a plasma display panel and a field emission display.

SUMMARY

One or more exemplary embodiment of the invention provides a display device in which a top chassis is omitted and a side surface of a display panel extends to a bottom chassis to fix elements of the display panel and a backlight unit within the display device.

An exemplary embodiment of the invention provides a display device including a display panel which displays an image with light, the display panel including a first substrate, a second substrate facing the first substrate, and an image display layer disposed between the first and second substrates, a backlight unit which generates and provides the light to the display panel, and a bottom chassis facing the first substrate to dispose the second substrate therebetween and to define an inner space with the first substrate. The image display layer, the second substrate and the backlight unit are accommodated in the inner space defined by the first substrate and the bottom chassis.

In an exemplary embodiment, the first substrate may include a first planar portion having a flat shape and defining opposing first sides thereof in a first direction; a first inclined portion provided in plural respectively extended in the first direction from the opposing first sides of the first planar portion to extend downward at a predetermined angle toward the bottom chassis; and a first side portion provided in plural respectively extended from ends of the first inclined portions to extend downward toward the bottom chassis.

In an exemplary embodiment, the first planar portion may further define opposing second sides thereof in a second direction crossing the first direction. The first substrate further may define a second side portion provided in plural respectively extended in the second direction from the opposing second sides of the first planar portion to extend downward toward the bottom chassis.

In an exemplary embodiment, each of the first inclined portions may be extended in the first direction to form an angle greater than about 0° and less than about 90° with respect to the first planar portion.

In an exemplary embodiment, with respect to the first planar portion, the first inclined portions may be disposed symmetrical to each other in the first direction, and the first side portions may be disposed symmetrical to each other in the first direction.

In an exemplary embodiment, distal ends of the first side portions may be respectively disposed at opposing first sides of the bottom chassis in the first direction.

In an exemplary embodiment, the first substrate may further define a second inclined surface thereof in plural respectively at the distal ends of the first side portions, each second inclined surface extended at a predetermined angle from an inner side surface of the first side portion toward a lower surface of the first side portion.

In an exemplary embodiment, the bottom chassis accommodated in the inner space defined by the first substrate and the bottom chassis may define a third inclined surface thereof provided in plural at the opposing first sides of the bottom chassis, each third inclined surface extended at a predetermined angle from a lower surface of the bottom chassis toward an outer side surface of the bottom chassis.

In an exemplary embodiment, a lower portion of the inner side surface of each of the first side portions may contact the outer side surface of the bottom chassis.

In an exemplary embodiment, the second inclined surfaces of the first side portions may respectively define a first groove with the third inclined surfaces of the bottom chassis. The display device may further include an adhesive member disposed in the first groove.

In an exemplary embodiment, distal ends of the first side portions may be respectively disposed overlapping the bottom chassis at opposing first sides of the bottom chassis in the first direction.

In an exemplary embodiment, the first substrate may further define a fourth inclined surface thereof in plural respectively at the distal ends of the first side portions, each fourth inclined surface extended at a predetermined angle from an outer side surface of the first side portion toward a lower surface of the first side portion.

In an exemplary embodiment, the bottom chassis accommodated in the inner space defined by the first substrate and the bottom chassis may define a fifth inclined surface thereof provided in plural at the opposing first sides of the bottom chassis, each fifth inclined surface extended at a predetermined angle from an upper surface of the bottom chassis toward an outer side surface of the bottom chassis.

In an exemplary embodiment, a bottom surface of the distal ends of the first side portions may contact the upper surface of the bottom chassis at the opposing first sides of the bottom chassis.

In an exemplary embodiment, the fourth inclined surfaces of the first side portions may respectively define a second groove with the fifth inclined surfaces of the bottom chassis.

The display device may further include an adhesive member disposed in the second groove.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings:

FIG. 3 is a cross-sectional view of another exemplary embodiment of a display device according to the invention.

DETAILED DESCRIPTION

Figure 1:
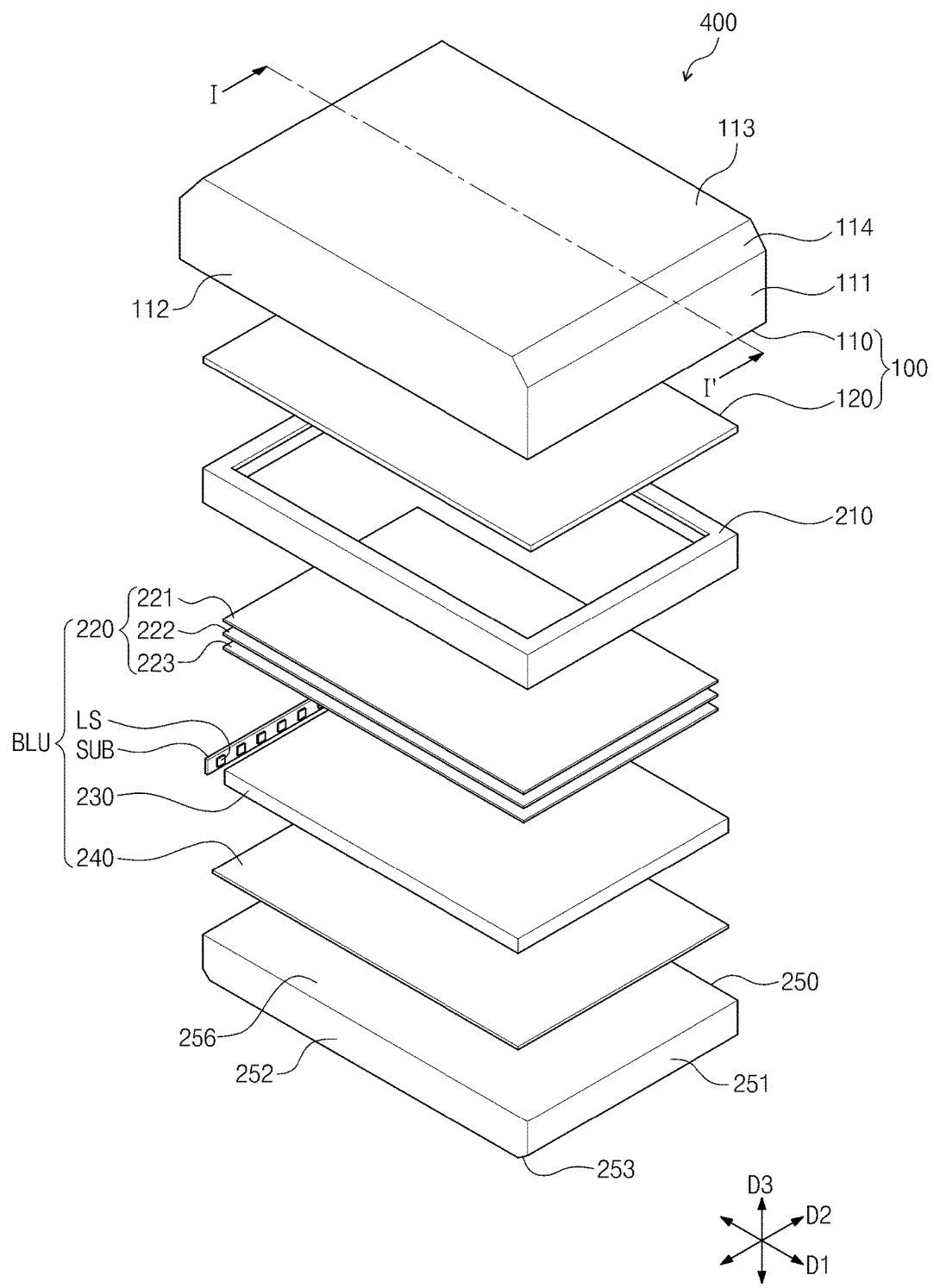
FIG. 1 is an exploded perspective view of an exemplary embodiment of a display device according to the invention.

Embodiments of the invention will be described below in more detail with reference to the accompanying drawings. The objects, characteristics and effects of the invention will become apparent with the detailed descriptions of the embodiments and the illustrations of related drawings as follows. The invention may, however, be embodied in different forms and should not be construed as limited to the embodiments set forth herein. Rather, these embodiments are provided so that this disclosure will be thorough and complete, and will fully convey the scope of the invention to those skilled in the art. However, this may be merely illustrative, and thus the present disclosure is not limited thereto. Like reference numerals refer to like elements throughout.

It will be understood that although the terms "first" and "second" are used herein to describe various elements, these elements should not be limited by these terms. In the specification, it will be understood that when a layer (or a film), a region, or a component is referred to as being 'on' another layer, region, or component, it can be directly on the other layer, region, or component, or intervening layers, regions, or components may also be present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is an exploded perspective view of an exemplary embodiment of a display device according to the invention.

Referring to FIG. 1, a display device 400 includes a display panel 100, a backlight unit BLU, a mold member 210 and a bottom chassis 250. The display panel 100 displays an image using a light. The backlight unit BLU generates the light and supplies the light to the display panel 100. The display panel 100 may include a plurality of pixels (not shown) for generating the image using the light.

The display panel 100 including an image display layer may include, but is not limited to, a liquid crystal display panel including a liquid crystal layer, an organic light emitting display panel including an organic light layer, an electro wetting display panel including an electro wetting layer, or an electrophoretic display panel including an electrophoretic layer.

The display panel 100 includes a first display substrate 110, a second display substrate 120 facing the first display substrate 110, and an image display layer (not shown) disposed between the first and second display substrates 110 and 120. The image display layer may be a liquid crystal layer.

The first display substrate 110 may be a color filter substrate including a plurality of color filters on a first base substrate, and the second display substrate 120 may be a thin film transistor ("TFT") substrate including the pixels, on a second base substrate.

The first display substrate 110 includes a first plane (or planar) portion 113 having a flat shape, a first inclined portion 114 provided in plural respectively connected to and extended from opposing sides of the first plane portion 113 in a first direction D1 to be bent or inclined downward at a predetermined angle with respect to the first plane portion 113, and a first side portion 111 provided in plural respectively connected to and extended from a distal end of the first inclined portions 114 to extend downward towards the bottom chassis 250. The first plane portion 113 may extend to define the first inclined portions 114 and the first inclined portions 114 may extend to define the first side portions 111. An image may be displayed at the first plane portion 113, but the invention is not limited thereto.

The first inclined portions 114 may be bent or inclined at an angle that is greater than about 0 degrees (°) and less than about 90° with respect to the first direction D1 and/or the first plane portion 113. The first inclined portions 114 may be disposed symmetrical to each other in the first direction D1 with respect to the first plane portion 113 therebetween. The first side portions 111 face each other in the first direction D1. The first side portions 111 may be disposed symmetrical to each other in the first direction D1 with respect to the first plane portion 113 therebetween.

The first display substrate 110 further includes a second inclined portion 112 respectively connected to and extended from opposing sides of the first plane portion 113 to extend downward in a second direction D2 crossing the first direction D1. The second side portions 112 face each other with respect to the first plane portion 113 therebetween. The first plane portion 113 may extend to define the second inclined portions 112. The first plane portion 113, the first inclined portions 114, the first side portions 111 and the second side portions 112 may define a whole of the first display substrate 110. Portions of the first display substrate 110 may define the first plane portion 113, the first inclined portions 114, the first side portions 111 and the second side portions 112 thereof.

The image display layer, the second display substrate 120, and the backlight unit BLU are accommodated in an inner space defined by the first plane portion 113, the first side portions 111, the first inclined portions 114 and the second inclined portions 112 of the first display substrate 110.

The backlight unit BLU is disposed below the display panel 100 to provide light to the display panel 100. The backlight unit BLU may be an edge type backlight unit. The backlight unit BLU includes a light source LS provided in plural, a light source substrate SUB, a plurality of optical sheets 220, a light guide plate 230 and a reflective sheet 240.

The light sources LS may be disposed adjacent to one side surface of the light guide plate 230 in the first direction D1. The reflection sheet 240 is disposed under the light guide plate 230, and the optical sheets 220 are disposed on the light guide plate 230. The display panel 100 is disposed on the optical sheets 220.

The light source substrate SUB extends lengthwise in the second direction D2, and the light source LS are mounted on the light source substrate SUB. The light sources LS may be disposed with a uniform interval along the second direction D2 in which the light source substrate SUB lengthwise extends.

The light source LS generates the light used by the display panel 100 to display an image, and the light generated from the light sources LS may be incident into the light guide plate 230. According to the exemplary embodiment, each of the light sources LS may include a light emitting diode but the invention is not limited thereto.

The light guide plate 230 guides the light provided from the light sources LS to allow the light to travel in and upward direction toward the display panel 100. The reflection sheet 240 reflects the light leaked downward from the light guide plate 230 to travel in the upward direction toward the display panel 100. The light guided upward by the light guide plate 230 may be diffused and concentrated through the optical sheets 220.

The optical sheets 220 include a diffusion sheet 223 to diffuse the light, a prism sheet 222 to concentrate the light, and a protection sheet 221 to protect the prism sheet 200. The diffusion sheet 223 is disposed on the light guide plate 230, and the prism sheet is disposed on the diffusion sheet 223. The protection sheet 221 disposed on the prism sheet 222 to protect the prism sheet 222 from impact thereto.

The diffusion sheet 223 diffuses the light provided from the light guide plate 230. The prism sheet 222 concentrates the light diffused by the diffusion sheet 223 to allow the light to travel in the upward direction substantially perpendicular to a plane surface of the light guide plate 230. The light passing through the prism sheet 222 travels in the upward direction, and thus the light may be provided to the display panel 100 with a uniform brightness.

The mold member 210 faces the light guide plate 230 with the optical sheets 220 therebetween and supports the display panel 100 thereon. The reflection sheet 240 is disposed on the bottom chassis 250. The bottom chassis 250 faces the first plane portion 113 of the first display substrate 110 with the second display substrate 120 therebetween.

The reflective sheet 240 includes a reflective material such as polyethylene terephthalate ("PET") and aluminum.

The bottom chassis 250 is connected to a lower portion of the first display substrate 110 of the display panel 100. The image display layer, the second display substrate 120 and the backlight unit BLU are accommodated in an inner space defined by the first display substrate 110 and the bottom chassis 250. This constitution will be described in detail with reference to FIG. 2.

The bottom chassis 250 includes a second plane (surface) portion 256 having a flat shape, a third side (surface) portion 251 provided in plural respectively extending from opposing sides of the second plane portion 256 in the first direction D1 and toward a lower portion of the second plane portion 256, and a fourth side (surface) portion 252 provided in plural respectively connected to opposing sides of the second plane portion 256 in the second direction D2 to extend downward toward the lower portion of the second plane portion 256.

The third side portion 251 defines a third inclined (surface) portion 251 of the bottom chassis 250, in plural. Each third inclined portion 251 is bent or inclined at a predetermined angle with respect to the third side portion 251 and toward a bottom surface of the bottom chassis 250.

Figure 2:
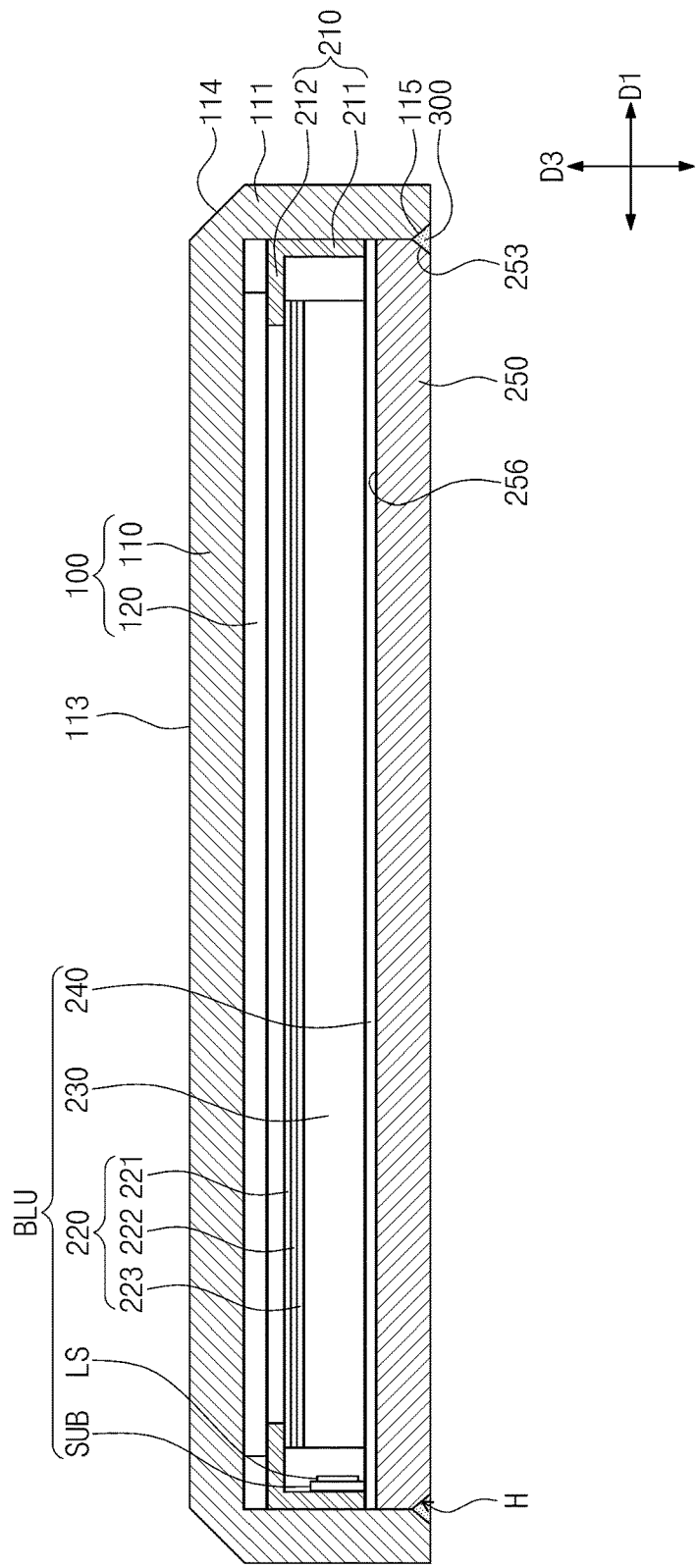
FIG. 2 is a cross-sectional view taken along line I-I' of FIG. 1.

FIG. 2 is a cross-sectional view taken along line of I-I' of FIG. 1.

In describing FIG. 2, reference symbols for above-described elements are given, and overlapped description for the elements will be omitted.

In FIG. 2, an interface between the first display substrate 110 and the second display substrate 120 represents a position at which the image display layer is disposed. As such, the image display layer, the second display substrate 120 and the backlight unit BLU are accommodated in the inner space defined by the first display substrate 110 and the bottom chassis 250.

Referring to FIG. 2, the first display substrate 110 respectively define a second inclined (surface) portion 115 in plural respectively at distal ends of the first side portions 111. The second inclined portions 115 are respectively bent or inclined at a predetermined angle from a lower portion of an inner surface of the first side portions 111 toward an outer lower direction of the first side portions 111.

The first plane portion 113 has a length in the first direction D1 greater than that of the second display substrate 120 and equal to that of the bottom chassis 250. A distance between the first side portions 111 in the first direction D1 may be the same as the length of the bottom chassis 250.

The second inclined portions 115 connect the lower portion of the inner surface of the first side portions 111 to a bottom surface of the first side portions 111.

The first side portions 111 are disposed at opposing sides of the bottom chassis 250 in the first direction D1. The bottom chassis 250 includes the third inclined portions 253 bent or inclined at a predetermined angle from both lower portions of the bottom chassis 250 toward an inner lower direction of the bottom chassis 250. The third inclined portions 253 connect both lower portions of an outer side surface of the bottom chassis 250 to a bottom surface of the bottom chassis 250.

A lower portion of an inner surface of the first side portions 111 has a predetermined area that contacts the outer side surface of the bottom chassis 250. A first groove H is respectively defined between the second inclined portions 115 of the first display substrate 110 and the third inclined portions 253 of the bottom chassis 250. An adhesive member 300 is disposed in the first groove H to fix the first display substrate 110 and the bottom chassis 250 to each other.

The reflective sheet 240, the light guide plate 230 and the optical sheets 220 are disposed in sequence on the bottom chassis 250. The mold member 210 may be disposed between the second display substrate 120 and the backlight unit BLU. The mold member 210 supports a predetermined area of an edge or boundary of the second display substrate 120.

The mold member 210 is disposed on the bottom chassis 250 to be lengthwise extended along an inner side of the first side portions 111 of the first display substrate 110.

The mold member 210 includes a first extension portion 211 extending lengthwise in a third direction D3 crossing the first and second directions D1 and D2, and a second extension portion 212 extending lengthwise from one end at an upper portion of the first extension portion 211 in the first direction D1. The first extension portion 211 contacts an inner surface of the first side portion 111.

The second extension portion 212 is disposed below the predetermined area of the boundary of the second display substrate 120 to support the second display substrate 120 thereon. The light sources LS are disposed at inner side of any first side portion 111 among the first side portions 111, and the light sources LS generates the light used by the display panel 100

A lower surface of the second extension portion 212 has a predetermined area that contacts an edge portion of the optical sheets 220, and the optical sheets 220 are disposed on the light guide plate 230 on the bottom chassis 250.

Although not shown, the mold member 210 may be fixed to an inner surface of the first side portions 111 by a fixing member such as a double sided tape (not shown). However, the invention is not limited thereto. In an alternative exemplary embodiment, for example, the mold member 210 may be fixed to the backlight unit 200 by using a fixing member such as a screw and/or a bracket.

Consequently, in one or more exemplary embodiment of the display device 400 discussed above, the display device 400 omits a top chassis of a conventional display device by a side surface portion of the display panel 100 extending toward a bottom chassis of the display device 400 to accommodate the display panel 100 and the backlight unit BLU within the display device 400.

FIG. 3 is a cross-sectional view of another exemplary embodiment of a display device according to the invention.

In describing FIG. 3, reference symbols for above-described elements are given, and overlapped description for the elements will be omitted.

In FIG. 3, an interface between the first display substrate 110 and the second display substrate 120 represents a position at which the image display layer is disposed. As such, the image display layer, the second display substrate 120 and the backlight unit BLU are accommodated in the inner space defined by the first display substrate 110 and the bottom chassis 250.

Referring to FIG. 3, the first side portions 111 are disposed overlapping a predetermined area of an upper surface of the bottom chassis 250 at opposing sides of the bottom chassis 250. The first display substrate 110 includes fourth inclined (surface) portions 254 respectively bent or inclined at a predetermined angle from an outer surface of the first side portions 111 to an inner lower direction of the first side portions 111. Each of the fourth inclined portions 254 respectively connects a bottom surface of the first inclined portions 111 to a lower portion of the outer surface of the first inclined portions 111.

The bottom chassis 250 includes fifth inclined (surface) portions 255 bent or inclined at a predetermined angle from the upper surface of the bottom chassis 250 at opposing sides thereof toward an outer lower direction of the bottom chassis 250. The bottom surface of the first side portion 111 of the first display substrate 110 contacts the upper surface of the bottom chassis 250 adjacent to an outer side surface the bottom chassis 250.

An area respectively between the fourth inclined portions 254 and the fifth inclined portions 255 is defined as a second groove H'. The adhesive member 300 is disposed in the second groove H' to fix the first display substrate 110 and the bottom chassis 250.

Consequently, in one or more exemplary embodiment of the display device 400 discussed above, the display device 400 omits a top chassis of a conventional display device by a side surface portion of the display panel 100 extending toward a bottom chassis of the display device 400 to accommodate the display panel 100 and the backlight unit BLU within the display device 400.

It will be apparent to those skilled in the art that various modifications and variations can be made in the invention. Thus, it is intended that the present disclosure covers the modifications and variations of this invention provided they come within the scope of the appended claims and their equivalents. Thus, to the maximum extent allowed by law, the scope of the invention is to be determined by the broadest permissible interpretation of the following claims and their equivalents, and shall not be restricted or limited by the foregoing detailed description.

What is claimed is:

1. A display device comprising:
   a display panel which displays an image with light, the display panel comprising a first substrate including a plurality of color filters, a second substrate facing the first substrate, the and an image display layer disposed between the first and second substrates;

a backlight unit which generates and provides the light to the display panel; and a bottom chassis facing the first substrate to dispose the second substrate therebetween, wherein the first substrate defines:

a first planar portion having a flat shape and defining opposing first sides thereof in a first direction;

a first inclined portion provided in plural respectively extended in the first direction from the opposing first sides of the first planar portion to extend downward at a predetermined angle toward the bottom chassis;

a first side portion provided in plural respectively extended from ends of the first inclined portions to extend downward toward the bottom chassis to define an inner space between the first substrate and the bottom chassis, wherein distal ends of the first side portions are respectively disposed at opposing first sides of the bottom chassis in the first direction; and a second inclined surface thereof in plural respectively at the distal ends of the first side portions, each second inclined surface extended at a predetermined angle from an inner side surface of the first side portion toward a lower surface of the first side portion, and the image display layer, the second substrate, and the backlight unit are accommodated in the inner space defined by the first substrate and the bottom chassis.

2. The display device of claim 1, wherein the first planar portion further defines opposing second sides thereof in a second direction crossing the first direction; and the first substrate further defines a second side portion provided in plural respectively extended in the second direction from the opposing second sides of the first planar portion to extend downward toward the bottom chassis.

3. The display device of claim 1, wherein each of the first inclined portions extended in the first direction forms an angle greater than about 0° and less than about 90° with respect to the first planar portion.

4. The display device of claim 3, wherein, with respect to the first planar portion, the first side portions respectively including the first inclined portions are disposed symmetrical to each other in the first direction.

5. The display device of claim 1, wherein the bottom chassis accommodated in the inner space defined by the first substrate and the bottom chassis defines a third inclined surface thereof provided in plural at the opposing first sides of the bottom chassis, each third inclined surface extended at a predetermined angle from a lower surface of the bottom chassis toward an outer side surface of the bottom chassis.

6. The display device of claim 5, wherein a lower portion of the inner side surface of each of the first side portions contacts the outer side surface of the bottom chassis.

7. The display device of claim 6, wherein the second inclined surfaces of the first side portions respectively define a first groove with the third inclined surfaces of the bottom chassis, further comprising an adhesive member disposed in the first groove.

8. The display device of claim 1, wherein the backlight unit accommodated in the inner space defined by the first substrate and the bottom chassis comprises:

a light source which generates the light; and a light guide plate which receives the light and guides the received light in an upward direction toward the display panel, wherein the light source is disposed at one side of the light guide plate.

9. The display device of claim 1, wherein the image display layer accommodated in the inner space defined by the first substrate and the bottom chassis comprises a liquid crystal layer.

10. A display device comprising:

a display panel which displays an image with light, the display panel comprising a first substrate including a plurality of color filters, a second substrate facing the first substrate, and an image display layer disposed between the first and second substrates;

a backlight unit which generates and provides the light to the display panel; and a bottom chassis facing the first substrate to dispose the second substrate therebetween, wherein the first substrate defines:

a first planar portion having a flat shape and defining opposing first sides thereof in a first direction;

a first inclined portion provided in plural respectively extended in the first direction from the opposing first sides of the first planar portion to extend downward at a predetermined angle toward the bottom chassis;

a first side portion provided in plural respectively extended from ends of the first inclined portions to extend downward toward the bottom chassis to define an inner space between the first substrate and the bottom chassis, wherein distal ends of the first side portions are respectively disposed at opposing first sides of the bottom chassis in the first direction; and a second inclined surface thereof in plural respectively at the distal ends of the first side portions, each second inclined surface extended at a predetermined angle from an outer side surface of the first side portion toward a lower surface of the first side portion, and the image display layer, the second substrate, and the backlight unit are accommodated in the inner space defined by the first substrate and the bottom chassis.

11. The display device of claim 10, wherein the bottom chassis accommodated in the inner space defined by the first substrate and the bottom chassis defines a third inclined surface thereof provided in plural at the opposing first sides of the bottom chassis, each third inclined surface extended at a predetermined angle from an upper surface of the bottom chassis toward an outer side surface of the bottom chassis.

12. The display device of claim 11, wherein a bottom surface of the distal ends of the first side portions contacts the upper surface of the bottom chassis at the opposing first sides of the bottom chassis.

13. The display device of claim 12, wherein the second inclined surfaces of the first side portions respectively define a first groove with the third inclined surfaces of the bottom chassis, further comprising an adhesive member disposed in the first groove.

* * * * *